US012476344B2

(12) United States Patent
Nakata et al.

(10) Patent No.: US 12,476,344 B2
(45) Date of Patent: Nov. 18, 2025

(54) VEHICLE WINDOW GLASS

(71) Applicant: AGC Inc., Tokyo (JP)

(72) Inventors: Atsutoshi Nakata, Tokyo (JP); Eita Umezawa, Tokyo (JP)

(73) Assignee: AGC INC., Tokyo (JP)

( * ) Notice: Subject to any disclaimer, the term of this patent is extended or adjusted under 35 U.S.C. 154(b) by 152 days.

(21) Appl. No.: 18/199,833

(22) Filed: May 19, 2023

(65) Prior Publication Data

US 2023/0387567 A1 Nov. 30, 2023

(30) Foreign Application Priority Data

May 24, 2022 (JP) ................................. 2022-084469
May 17, 2023 (JP) ................................. 2023-081689

(51) Int. Cl.
*H01Q 1/12* (2006.01)
*H05B 3/84* (2006.01)

(52) U.S. Cl.
CPC ............. *H01Q 1/1278* (2013.01); *H05B 3/84* (2013.01); *H05B 2203/016* (2013.01)

(58) Field of Classification Search
CPC .. H01Q 1/1278; H05B 3/84; H05B 2203/016; H05B 2203/008; H05B 2203/014; H05B 2203/017
See application file for complete search history.

(56) References Cited

U.S. PATENT DOCUMENTS

2005/0030235 A1* 2/2005 Noguchi .............. H01Q 1/1278 343/704
2008/0158073 A1 7/2008 Ibe et al.
2016/0268670 A1* 9/2016 Kobayashi ........... H01Q 1/1278
2018/0233818 A1* 8/2018 Nakano .................. H01Q 1/523
2019/0190117 A1 6/2019 Morishita

FOREIGN PATENT DOCUMENTS

EP 3570370 A1 * 11/2019 ........... H01Q 1/1278
JP H09-181514 A 7/1997
JP 2008-182682 A 8/2008
JP 2009-164678 A 7/2009
WO WO-2018/003928 A1 1/2018

* cited by examiner

*Primary Examiner* — Dimary S Lopez Cruz
*Assistant Examiner* — Anna N Hamadyk
(74) *Attorney, Agent, or Firm* — Foley & Lardner LLP

(57) ABSTRACT

A vehicle window glass of the invention is attached to a window frame at a rear portion of a vehicle body. The vehicle window glass includes a glass plate, an antenna, and a defogger. The defogger includes a first bus bar, a second bus bar, and a plurality of heater wires. The antenna includes a power feeder, a first antenna portion, and a second antenna portion. The first antenna portion has a portion capacitively coupled to a metal portion of the window frame. The second antenna portion includes a first element, a second element, and a third element. The first element and the second element are disposed in that order toward the defogger in a vertical direction. The second antenna portion has a portion capacitively coupled to the defogger.

19 Claims, 8 Drawing Sheets

VEHICLE WINDOW GLASS

CROSS-REFERENCE TO RELATED APPLICATIONS

This application claims priority from Japanese Patent Application No. 2022-084469 filed on May 24, 2022, and Japanese Patent Application No. 2023-081689 filed on May 17, 2023, the contents of which are incorporated herein by reference in their entirety.

BACKGROUND OF THE INVENTION

Field of the Invention

The present invention relates to a vehicle window glass.

Description of Related Art

Automobiles in recent years have had a window glass on which an antenna capable of receiving radio waves in various frequency bands such as AM broadcast waves, FM broadcast waves, digital audio broadcasting (DAB) Band III of the European standard, and terrestrial digital broadcast waves is formed.

An antenna formed in an opening of the window glass in this way has a pattern that can obtain a predetermined reception sensitivity according to an area of the opening of the window glass. For example, a defogger having an electric heating wire for heating a glass is disposed on a rear glass of an automobile for anti-fogging and anti-icing purposes. An antenna pattern for obtaining a predetermined sensitivity to radio waves of a predetermined frequency band is formed in a region of the opening that is different from the defogger region.

In the disclosure of PCT International Publication No. WO 2018/003928, an example is disclosed in which an antenna for combined use of AM broadcast waves and FM broadcast waves, and a DAB antenna are disposed in an opening outside a defogger region on a vehicle rear glass.

The invention provides a vehicle window glass capable of receiving radio waves of a predetermined frequency with a desired gain using an antenna pattern different from an antenna pattern formed on a conventional rear glass.

SUMMARY OF THE INVENTION

In order to solve the above-described problem, one aspect of the invention has the following configuration.

A vehicle window glass according to one aspect of the invention is configured to be attached to a window frame at a rear portion of a vehicle body. The vehicle window glass includes a glass plate, an antenna provided on the glass plate, and an electric heating defogger provided on the glass plate. A direction parallel to a horizontal plane is defined as a horizontal direction in a plan view with the vehicle window glass attached to the window frame. A direction orthogonal to the horizontal direction is defined as a vertical direction. The defogger includes a first bus bar extending in the vertical direction at both end sides of the glass plate in the horizontal direction, a second bus bar extending in the vertical direction at both end sides of the glass plate in the horizontal direction, and a plurality of heater wires disposed between the first bus bar and the second bus bar, the plurality of heater wires being configured to heat the glass plate by applying a voltage through the first bus bar and the second bus bar. The antenna includes a power feeder, a first antenna portion electrically connected to the power feeder, and a second antenna portion electrically connected to the power feeder. The first antenna portion has a portion capacitively coupled to a metal portion of the window frame with the glass plate attached to the window frame in a plan view of the glass plate. The second antenna portion includes a first element comprising a portion extending parallel to each other in the horizontal direction, a second element comprising a portion extending parallel to each other in the horizontal direction, and a third element connecting the first element and the second element. The first element and the second element are disposed in that order toward the defogger in the vertical direction. The second antenna portion has a portion capacitively coupled to the defogger.

In the vehicle window glass according to one aspect of the invention, the first antenna portion may include a first L-shaped element, and the first L-shaped element is connected to the power feeder and has an L-shape along the metal portion.

In the vehicle window glass according to one aspect of the invention, in the first antenna portion, a range of $0.10\times\lambda\times k\leq L_1\leq 0.40\times\lambda\times k$ may be satisfied provided that a length thereof capacitively coupled to the metal portion is $L_1$, a wavelength of a radio wave in air in a frequency band received by the antenna is $\lambda$, and a wavelength shortening coefficient of the glass plate is k.

In the vehicle window glass according to one aspect of the invention, a range of $0.60\times\lambda\times k\leq L_2\leq 0.90\times\lambda\times k$ may be satisfied provided that the power feeder serves as a starting point and that a distance from the power feeder to an open end of the first element via the second element and the third element is $L_2$, a wavelength of a radio wave in air in a frequency band received by the antenna is $\lambda$, and a wavelength shortening coefficient of the glass plate is k.

In the vehicle window glass according to one aspect of the invention, the second antenna portion may include a fourth element, and the fourth element is positioned on an opposite side of the second element with respect to the first element to be connected to the third element and extending in the horizontal direction. The fourth element may have a portion capacitively coupled to the metal portion.

In the vehicle window glass according to one aspect of the invention, the fourth element may satisfy a range of $0.10\times\lambda\times k\leq L_4\leq 0.90\times\lambda\times k$ provided that a length thereof capacitively coupled to the metal portion is $L_4$, a wavelength of a radio wave in air in a frequency band received by the antenna is $\lambda$, and a wavelength shortening coefficient of the glass plate is k.

In the vehicle window glass according to one aspect of the invention, the fourth element may branch from an end portion of the third element.

The vehicle window glass according to one aspect of the invention may include a fifth element positioned on an opposite side of the first antenna portion with respect to the third element to connect the first element and the second element.

The vehicle window glass according to one aspect of the invention may include a sixth element positioned on the first antenna portion side with respect to the third element to connect the first element and the fourth element.

The vehicle window glass according to one aspect of the invention may include a seventh element positioned on an opposite side of the first antenna portion with respect to the third element to connect the first element and the fourth element.

The vehicle window glass according to one aspect of the invention may include an eighth element extending in the horizontal direction from a position close to a connection point of the seventh element with respect to the fourth element to a side opposite to the first antenna portion.

In the vehicle window glass according to one aspect of the invention, the first element may have a portion capacitively coupled to the first antenna portion.

In the vehicle window glass according to one aspect of the invention, the first element may satisfy a range of $0.01\times\lambda\times k\leq D_1\leq 0.50\times\lambda\times k$ provided that a length thereof capacitively coupled to the first antenna portion is $D_1$, a wavelength of a radio wave in air in a frequency band received by the antenna is $\lambda$, and a wavelength shortening coefficient of the glass plate is k.

The vehicle window glass according to one aspect of the invention may include an auxiliary element disposed between the defogger and the second element, and the auxiliary element has an L-shape or a T-shape extending in the horizontal direction.

In the vehicle window glass according to one aspect of the invention, the auxiliary element may satisfy a range of $0.10\times\lambda\times k\leq D_H\leq 0.90\times\lambda\times k$ provided that a length of a portion thereof extending in the horizontal direction is $D_H$, a wavelength of a radio wave in air in a frequency band received by the antenna is $\lambda$, and a wavelength shortening coefficient of the glass plate is k.

In the vehicle window glass according to one aspect of the invention, the auxiliary element may have a T-shape. The auxiliary element may include a first horizontal auxiliary element extending from a T-shaped branch point toward the first antenna portion, and a second horizontal auxiliary element extending from the T-shaped branch point toward an opposite side of the first antenna portion. A ratio between a length of the first horizontal auxiliary element and a length of the second horizontal auxiliary element may satisfy a range of 1.0:0.5 to 1.0:2.0.

In the vehicle window glass according to one aspect of the invention, the auxiliary element may be connected to a first heater wire closest to the second element among the plurality of heater wires.

In the vehicle window glass according to one aspect of the invention, the defogger may include a first short-circuit line which short-circuits at least the first heater wire and a second heater wire adjacent to the first heater wire. A connection point between the auxiliary element and the first heater wire may be disposed at a position close to a connection point between the first short-circuit line and the first heater wire.

In the vehicle window glass according to one aspect of the invention, the first short-circuit line may be disposed at a center between the first bus bar and the second bus bar.

In the vehicle window glass according to one aspect of the invention, the defogger may include a second short-circuit line disposed between the first bus bar and the first short-circuit line to short-circuit at least the first heater wire and the second heater wire, and a third short-circuit line disposed between the second bus bar and the first short-circuit line to short-circuit at least the first heater wire and the second heater wire.

In the vehicle window glass according to one aspect of the invention, the antenna may include a third antenna portion electrically connected to the power feeder. The first element may have a portion capacitively coupled to a part of the third antenna portion.

In the vehicle window glass according to one aspect of the invention, the first element may satisfy a range of $0.01\times\lambda\times k\leq D_3\leq 0.40\times\lambda\times k$ provided that a length thereof capacitively coupled to the third antenna portion is $D_3$, a wavelength of a radio wave in air in a frequency band received by the antenna is $\lambda$, and a wavelength shortening coefficient of the glass plate is k.

In the vehicle window glass according to one aspect of the invention, the third antenna portion may include a second L-shaped element connected to the power feeder or the first antenna portion and having an L shape on a side opposite to the metal portion with respect to the first antenna portion.

In the vehicle window glass according to one aspect of the invention, the third antenna portion may be disposed on an opposite side of the first antenna portion with respect to the first element.

In the vehicle window glass according to one aspect of the invention, the antenna may be configured to receive FM broadcast waves.

Effects of the Invention

According to the invention, it is possible to receive radio waves of a predetermined frequency with a desired gain using an antenna pattern different from an antenna pattern formed on a conventional rear glass.

DETAILED DESCRIPTION OF THE INVENTION

Figure 1:
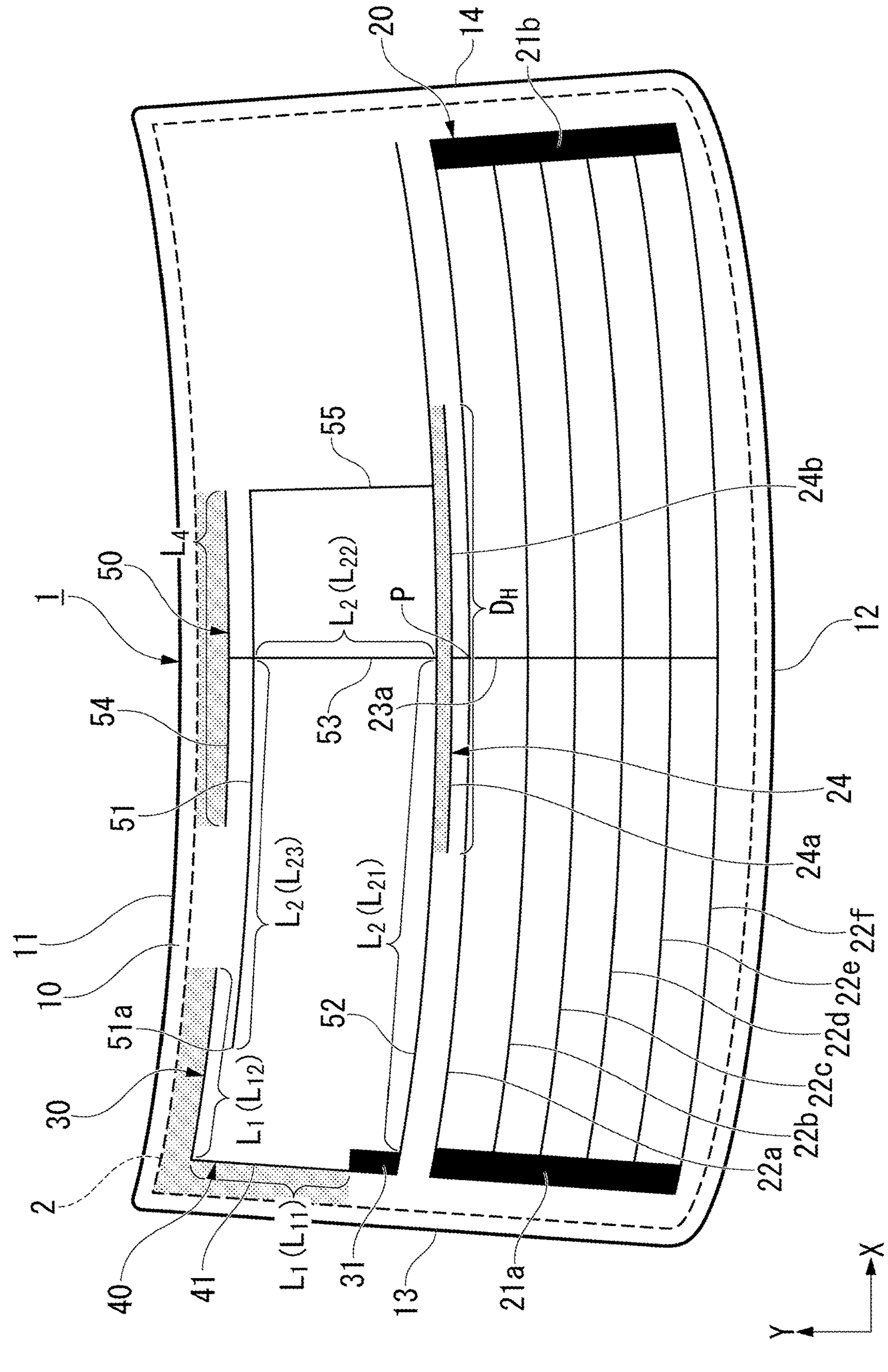
FIG. 1 is a plan view showing a vehicle window glass according to a first embodiment of the invention.

Hereinafter, a vehicle window glass according to an embodiment of the invention will be described in detail with reference to the drawings. Furthermore, for ease of understanding, scales of each of portions in the drawings may be different from actual ones. In directions such as parallel, perpendicular, orthogonal, horizontal, vertical, upward and downward, and leftward and rightward, a deviation to an extent that effects of the embodiment are not impaired is allowed. A shape of a corner is not limited to a right angle and may be arcuately rounded. Parallel, perpendicular, orthogonal, horizontal, and vertical may include substantially parallel, substantially perpendicular, substantially orthogonal, substantially horizontal, and substantially vertical.

Also, hereinafter, in a plan view with the vehicle window glass attached to a window frame, a direction parallel to a horizontal plane is defined as a horizontal direction, and a direction orthogonal to the horizontal direction is defined as a vertical direction. Also, a positional relationship of members may be described with reference to an XY coordinate set in the drawings as necessary. In the XY coordinate system, a direction parallel to an X-axis (X-axis direction) and a direction parallel to a Y-axis (Y-axis direction) represent a left-right direction (horizontal direction) of a glass plate and an up-down direction (vertical direction) of the glass plate. Also, "to" indicating a numerical range means that numerical values stated before and after "to" are included as a lower limit value and an upper limit value. Also, for ease of understanding, gray hatching is added to a portion in which an antenna pattern formed on the glass plate is capacitively coupled.

First Embodiment

FIG. 1 is a plan view showing a vehicle window glass 1 according to a first embodiment of the invention. The vehicle window glass 1 shown in FIG. 1 is attached to a window frame 2 at a rear portion of a vehicle body. Furthermore, in FIG. 1, an opening of the window frame 2 is indicated by a dotted line. Also, in FIG. 1, the vehicle window glass 1 in a state of being attached to the window frame 2 is shown as viewed from the inside of the vehicle (a view from inside the vehicle). In FIG. 1, a circumferential edge portion of a main surface of a glass plate 10 and the window frame 2 which is a flange serving as a metal portion are attached to each other with an adhesive such as a urethane resin (not shown) on an outer side of the opening indicated by the dotted line.

As shown in FIG. 1, the vehicle window glass 1 according to the embodiment includes the glass plate 10, a defogger 20, and an antenna 30. The glass plate 10 has a substantially quadrangular outer shape in a plan view. Outer edges of the glass plate 10 include an upper edge 11 and a lower edge 12 facing in the vertical direction and a left edge 13 and a right edge 14 facing in the horizontal direction when the glass plate 10 is attached to the window frame 2.

The defogger 20 is a conductive pattern provided on the glass plate 10 for removing condensation (fogging) on the glass plate 10. The defogger 20 shown in FIG. 1 is an electric heating defogger. The defogger 20 includes a first bus bar 21*a*, a second bus bar 21*b*, and a plurality of heater wires 22*a* to 22*f* disposed between the first bus bar 21*a* and the second bus bar 21*b*.

The first bus bar 21*a* and the second bus bar 21*b* extend in the vertical direction at both end sides in the horizontal direction of the glass plate 10. The first bus bar 21*a* is a conductor pattern extending in the vertical direction along the left edge 13 of the glass plate 10. The first bus bar 21*a* extends along the left edge 13 in the vertical direction.

The second bus bar 21*b* is a conductor pattern extending in the vertical direction along the right edge 14 of the glass plate 10. The second bus bar 21*b* extends along the right edge 14 in the vertical direction. The first bus bar 21*a* and the second bus bar 21*b* supply power to the heater wires 22*a* to 22*f*.

The heater wires 22*a* to 22*f* are disposed between the first bus bar 21*a* and the second bus bar 21*b*, and the glass plate 10 is heated when a voltage (DC voltage) is applied through the first bus bar 21*a* and the second bus bar 21*b*. When the glass plate 10 is heated, condensation (fogging) on the glass plate 10 is removed.

The heater wires 22*a* to 22*f* extend in the horizontal direction such that they run parallel to each other between the first bus bar 21*a* and the second bus bar 21*b*, and are disposed to be aligned in the vertical direction at a distance from each other. One ends of the heater wires 22*a* to 22*f* are connected to the first bus bar 21*a*, and the other ends of the heater wires 22*a* to 22*f* are connected to the second bus bar 21*b*. Furthermore, the number of heater wires 22*a* to 22*f* may be more or less than six as long as an effect of removing the condensation (fogging) on the glass plate 10 is obtained while visibility of the outside of the vehicle via the glass plate 10 is secured.

The antenna 30 is configured to receive radio waves in a predetermined frequency band, and resonates at a frequency in the predetermined frequency band. For example, the antenna 30 may be configured to receive radio waves in a very high frequency (VHF) band with frequencies of 30 MHz to 300 MHz. The radio waves in the VHF band include radio waves in Band III (174 MHz to 240 MHz) of the DAB standard, FM broadcast waves (76 MHz to 108 MHz), and the like. The antenna 30 according to the embodiment can receive, for example, FM broadcast waves.

The antenna 30 is a glass antenna provided on the glass plate 10. The antenna is disposed on a side above the defogger 20 when the glass plate 10 is attached to the window frame 2. The antenna 30 includes a power feeder 31, a first antenna portion 40 electrically connected to the power feeder 31, and a second antenna portion 50 electrically connected to the power feeder 31.

The power feeder 31 is a conductor pattern formed in a rectangular shape. The power feeder 31 is electrically connected to one end of a power feed line (not shown). Furthermore, a shape of the power feeder 31 may be other shapes such as a circular shape or another polygonal shape. The power feeder 31 is disposed apart from the first bus bar 21*a* at a position close to the left edge 13 of the glass plate 10 in the vertical direction.

The first antenna portion 40 has a first L-shaped element 41 connected to the power feeder 31. The first L-shaped element 41 is a conductor pattern that bends in an L-shape from the power feeder 31 along the left edge 13 and the upper edge 11 of the glass plate 10. Furthermore, a conductor pattern of the first antenna portion 40 is not limited to an L-shaped conductor pattern, and an optionally-selected pattern can be formed outside a region of the defogger 20 as long as it can receive radio waves of a predetermined frequency. For example, the conductor pattern of the first antenna portion 40 may be a linear element having an open end on an extension line along the left edge 13.

The first antenna portion 40 is capacitively coupled to the metal portion of the window frame 2. Therefore, the first antenna portion 40 and the metal portion of the window frame 2 function as a part of the antenna. Also, if the first antenna portion 40 has the first L-shaped element 41, the antenna 30 having the first L-shaped element 41 is disposed in a region inside the opening for capacitive coupling with the metal portion of the window frame 2.

A distance between the first L-shaped element 41 and the metal portion of the window frame 2 is, for example, approximately 10 mm, but may be 30 mm or less, 20 mm or less, or 15 mm or less. The distance between the first L-shaped element 41 and the metal portion of the window frame 2 has no particular lower limit, but may be, for example, 1 mm or more, 3 mm or more, or 5 mm or more.

The first antenna portion 40 preferably satisfies a range of the following relational expression (1) provided that a length thereof capacitively coupled to the metal portion of the window frame 2 is $L_1$, a wavelength of the radio wave in air in the frequency band received by the antenna 30 is $\lambda$, and a wavelength shortening coefficient of the glass plate 10 is k. Therefore, antenna characteristics of the vehicle window glass 1 can be improved. Specifically, a vertical portion of the first L-shaped element 41 functions as a low-frequency improving element for the antenna characteristics. Furthermore, a horizontal portion of the first L-shaped element 41 functions as a peak shift element for the antenna characteristics.

$$0.10\times\lambda\times k\leq L_1\leq 0.40\times\lambda\times k \quad (1)$$

Also, it is more preferable that the length $L_1$ satisfy the following range.

$$0.20\times\lambda\times k\leq L_1\leq 0.30\times\lambda\times k \quad (1a)$$

The length ($L_1$) in which the first antenna portion 40 is capacitively coupled to the metal portion of the window frame 2 is a sum of a length ($L_{11}$) of the vertically extending portion of the first L-shaped element 41 and a length ($L_{12}$) of the horizontally extending portion of the first L-shaped element 41. Furthermore, if the conductor pattern of the first antenna portion 40 is a linear element having an open end on an extension line along the left edge 13 as described above, a relationship of $L_1=L_{11}$ is established.

For example, when the antenna 30 receives a radio wave of FM broadcast waves (76 MHz to 108 MHz), the wavelength (λ) of the radio wave in air in the frequency band received by the antenna 30 is a wavelength (≈3.26 m) in air at a center frequency (92 MHz) thereof. The wavelength shortening coefficient (k) of the glass plate 10 is a coefficient (for example, k≈0.64) of 1 (in air: k=1) or less.

The second antenna portion 50 includes a first element 51, a second element 52, and a third element 53, and may optionally further include a fourth element 54 and a fifth element 55. Furthermore, a conductor pattern of the second antenna portion 50 can also be formed in an optionally-selected antenna pattern outside the region of the defogger 20 if it is necessary to have a specification capable of receiving radio waves of a predetermined frequency. Here, the optionally-selected antenna pattern means, for example, a pattern that forms an antenna capable of receiving radio waves in a frequency band higher than that of the antenna 30 in a blank region on a right side of the antenna 30 on a side above the defogger 20 in FIG. 1. For example, if the antenna 30 is an antenna capable of receiving FM broadcast waves, an antenna capable of receiving at least one of Band III of the DAB standard and terrestrial digital broadcast waves (470 MHz to 710 MHz) may be disposed in the blank region.

The second element 52 is connected to the power feeder 31. The second element 52 is a linear conductor pattern extending in the horizontal direction from the power feeder 31 toward the right edge 14 of the glass plate 10. The third element 53 is connected to the second element 52 at an intermediate position in the horizontal direction of the glass plate 10. The third element 53 is a linear conductor pattern extending from the second element 52 toward the upper edge 11 of the glass plate 10. Furthermore, the third element 53 is a pattern extending in the vertical direction. The vertical direction described herein also includes a substantially vertical direction with respect to the horizontal direction. With an absolute value of an angle θ with respect to the vertical direction, the substantially vertical direction may, for example, be in a range of 0°≤θ≤15°, 0°≤θ≤10°, 0°≤θ≤5°, 0°≤θ≤3°, or be θ=0°. When the angle θ at which the third element 53 extends is brought close to 0° as described above, a design thereof is improved. Furthermore, the third element 53 may extend at a predetermined angle θ (for example, in a range of 0°<θ≤75° in an absolute value) with respect to the vertical direction. Furthermore, the same range of the angle θ described above can also be applied to the fifth element 55, the sixth element 56, and the seventh element 57 to be described later.

The first element 51 is a linear conductor pattern extending in the horizontal direction. The first element 51 is positioned on an opposite side of the defogger 20 with respect to the second element 52 (on a side above the second element 52). The first element 51 is connected to the second element 52 by the third element 53. The first element 51 is connected to the third element 53 and branched, thereby extending to both sides in the horizontal direction.

One end (first end) of the first element 51 on the first antenna portion 40 side is an open end 51*a*. The other end (second end) of the first element 51 on an opposite side of the first antenna portion 40 is connected to the second element 52 by the fifth element 55 when the fifth element 55 is provided. When the other end (second end) is an open end when the fifth element 55 is not provided. Furthermore, a length from a connection point between the first element 51 and the third element 53 to one end (the open end 51*a*) is larger than a length from the connection point between the first element 51 and the third element 53 to the other end. Furthermore, the "connection point" is not limited to the connection point itself, but may be a "position close to the connection point" including a portion slightly deviated from the connection point, and the same interpretation can be applied to the "connection point" to be described later.

In the second antenna portion 50, when the power feeder 31 serves as a starting point and when a distance from the power feeder 31 to the open end 51*a* of the first element 51 via the second element 52 and the third element 53 is $L_2$, the wavelength of the radio wave in air in the frequency band received by the antenna 30 is λ, and the wavelength shortening coefficient of the glass plate 10 is k, a range of the following relational expression (2) is preferably satisfied. Therefore, the antenna characteristics of the vehicle window glass 1 can be improved.

$$0.60\times\lambda\times k\leq L_2\leq 0.90\times\lambda\times k \quad (2)$$

Also, it is more preferable that the length $L_2$ satisfy the following range.

$$0.70\times\lambda\times k\leq L_2\leq 0.80\times\lambda\times k \quad (2a)$$

When the power feeder 31 serves as a starting point in the second antenna portion 50, the distance ($L_2$) from the power feeder 31 to the open end 51*a* of the first element 51 via the second element 52 and the third element 53 is a sum of a length ($L_{21}$), a length ($L_{22}$), and a length ($L_{23}$). The length ($L_{21}$) is a length of the second element 52 from the power feeder 31 to its connection position with the third element 53. The length ($L_{22}$) is a length of the third element 53 from its connection position with the second element 52 to its connection position with the first element 51. The length ($L_{23}$) is a length of the first element 51 from its connection position with the third element 53 to the open end 51*a*.

The fourth element 54 is an optionally provided element as described above, and is a linear conductor pattern extending in the horizontal direction. The fourth element 54 is positioned on an opposite side of the second element 52 with respect to the first element 51 (on a side above the first element 51). The fourth element 54 is connected to the first element 51 and the second element 52 by the third element 53. The first element 51 is connected to the third element 53 to be branched particularly from an upper end portion of the third element 53, and extends therefrom to both sides in the horizontal direction.

One end (first end) of the fourth element 54 on the first antenna portion 40 side and the other end (second end) of the fourth element 54 on an opposite side of the first antenna portion 40 are disposed at the same distance from the branch point of the upper end portion of the third element 53, but they may be at different distances. Then, the fourth element 54 is capacitively coupled to the metal portion of the window frame 2 extending along the upper edge 11 of the glass plate 10. Therefore, the fourth element 54 and the metal portion of the window frame 2 function as a part of the antenna.

A distance between the fourth element 54 and the metal portion of the window frame 2 is, for example, approximately 10 mm, but may be 30 mm or less, 20 mm or less, or 15 mm or less. The distance between the fourth element 54 and the metal portion of the window frame 2 has no particular lower limit, but may be, for example, 1 mm or more, 3 mm or more, or 5 nm or more.

The fourth element 54 preferably satisfies a range of the following relational expression (3) provided that a length thereof capacitively coupled to the metal portion of the window frame 2 is $L_4$, the wavelength of the radio wave in air in the frequency band received by the antenna 30 is λ, and the wavelength shortening coefficient of the glass plate 10 is k. Therefore, the antenna characteristics of the vehicle window glass 1 can be improved. Specifically, the fourth element 54 functions as a peak shift element for the antenna characteristics.

$$0.10\times\lambda\times k \leq L_4 \leq 0.90\times\lambda\times k \quad (3)$$

Also, it is more preferable that the length $L_4$ satisfy the following range.

$$0.20\times\lambda\times k \leq L_4 \leq 0.30\times\lambda\times k \quad (3a)$$

In FIG. 1, the length ($L_4$) in which the fourth element 54 is capacitively coupled to the metal portion of the window frame 2 is a length from one end of the fourth element 54 on the first antenna portion 40 side to the other end of the fourth element 54 on an opposite side of the first antenna portion 40.

The fifth element 55 is positioned on an opposite side of the first antenna portion 40 with respect to the third element 53 (on a right side of the third element 53) and is connected to the first element 51 and the second element 52. The fifth element 55 is a linear conductor pattern extending in the vertical direction from the other end of the first element 51 on an opposite side of the first antenna portion 40 toward the second element 52. However, as described above, the fifth element 55 may extend at a predetermined angle θ (for example, in a range of $0° < \theta \leq 75°$ in an absolute value) with respect to the vertical direction. Also, the fifth element 55 forms a loop circuit to adjust an inductor of a resonant circuit of the antenna 30.

The defogger 20 includes a first short-circuit line **23*a* that short-circuits at least the heater wire 22*a* (first heater wire) and the heater wire 22*b* (second heater wire) adjacent to the heater wire 22*a*. In the example shown in FIG. 1, the first short-circuit line 23*a* is a linear conductor that short-circuits the plurality of heater wires adjacent to each other at least in the vertical direction among the heater wires 22*a* to 22*f*, and may short-circuit all the heater wires. The first short-circuit line 23*a* is disposed at a center between the first bus bar 21*a* and the second bus bar 21*b*. The first short-circuit line 23*a* is positioned on an extension line of the third element 53**.

Furthermore, when a length in the horizontal direction between the first bus bar **21*a* and the short-circuit line 23 and a length in the horizontal direction between the second bus bar 21*b* and the short-circuit line 23 are set to a length that does not generate a standing wave in the predetermined frequency band received by the antenna 30, this is preferable because antenna sensitivity does not decrease. That is, when the wavelength in air in the predetermined frequency band is an optionally-selected wavelength λ between λ1 and λ2, the wavelength shortening coefficient of the glass plate 10 is k, and an integer of 1 or more is N, the length in the horizontal direction between the first bus bar 21*a* and the short-circuit line 23 and the length in the horizontal direction between the second bus bar 21*b* and the short-circuit line 23** are preferably set not to be $N\times k\times\lambda/2$.

For example, if the antenna 30 receives radio waves of FM broadcast waves (76 MHz to 108 MHz), when $\lambda1\approx2776$ mm, $\lambda2\approx3945$ mm, $k\approx0.64$, and N=1, the length in the horizontal direction between the first bus bar **21*a* and the short-circuit line 23 and the length in the horizontal direction between the second bus bar 21*b* and the short-circuit line 23 are preferably in a range other than 888 mm to 1262 mm. Also, the length in the horizontal direction between the first bus bar 21*a* and the short-circuit line 23 and the length in the horizontal direction between the second bus bar 21*b* and the short-circuit line 23** are preferably less than $k\times\lambda/2$ and more preferably $k\times(3\times\lambda/8)$ or less.

Also, an auxiliary element 24 that can be optionally added may be formed between the defogger 20 and the second element 52 in the glass plate 10. In FIG. 1, the auxiliary element 24 is a T-shaped linear conductor pattern, and is connected to the heater wire **22*a* that is closest to the second element 52 among the plurality of heater wires 22*a* to 22*f*. A portion of the auxiliary element 24 extending in the horizontal direction is capacitively coupled to the second element 52. Therefore, the auxiliary element 24 and the second element 52** function as a part of the antenna.

A distance between the auxiliary element 24 and the second element 52 is, for example, approximately 10 mm, but may be 30 mm or less, 20 mm or less, or 15 mm or less. A distance between the fourth element 54 and the metal portion of the window frame 2 has no particular lower limit, but may be, for example, 1 mm or more, 3 mm or more, or 5 mm or more. Furthermore, the second element 52 may be capacitively coupled to the heater wire **22*a* of the defogger 20 without the auxiliary element 24** interposed.

In FIG. 1, the auxiliary element 24 preferably satisfies a range of the following relational expression (4) provided that a length of the portion thereof extending in the horizontal direction is $D_H$, the wavelength of the radio wave in air in the frequency band received by the antenna 30 is λ, and the wavelength shortening coefficient of the glass plate 10 is k. Therefore, the antenna characteristics of the vehicle window glass 1 can be improved. Specifically, the auxiliary element 24 functions as a high-frequency improving element for the antenna characteristics.

$$0.10\times\lambda\times k \leq D_H \leq 0.90\times\lambda\times k \quad (4)$$

Also, it is more preferable that the length $D_H$ satisfy the following range.

$$0.25\times\lambda\times k \leq D_H \leq 0.50\times\lambda\times k \quad (4a)$$

The length ($D_H$) of the portion extending in the horizontal direction of the auxiliary element 24 is a total length of a first horizontal auxiliary element **24*a* extending from a T-shaped branch point toward the first antenna portion 40 and a second horizontal auxiliary element 24*b* extending from the T-shaped branch point toward an opposite side of the first antenna portion 40**.

Furthermore, the auxiliary element 24 is not limited to a T-shape, and may be an L-shaped without either the first horizontal auxiliary element **24*a* or the second horizontal auxiliary element 24*b*. Also, a connection point P between the auxiliary element 24 and the heater wire 22*a* coincides with a connection point between the first short-circuit line 23***a* and the heater wire 22*a*, but may be disposed to deviate from the connection point as long as it is at a position close to the connection point between the first short-circuit line 23*a* and the heater wire 22*a*. Furthermore, the auxiliary element 24 may have a T-shape or an L-shape that is vertically inverted in FIG. 1 so that the connection point P is positioned at or close to the connection point between the second element 52 and the third element 53 to have a disposition in which the auxiliary element 24 and the defogger 20 (the heater wire 22*a*) are capacitively coupled.

As described above, the vehicle window glass 1 according to the embodiment is the vehicle window glass 1 attached to the window frame 2 at a rear portion of a vehicle body, and includes the glass plate 10, the antenna 30 provided on the glass plate 10, and the defogger 20 of an electric heating type provided on the glass plate 10. The defogger 20 includes the first bus bar 21*a* and the second bus bar 21*b* extending in the vertical direction at both end sides of the glass plate 10 in the horizontal direction, and the plurality of heater wires 22*a* to 22*f* disposed between the first bus bar 21*a* and the second bus bar 21*b* and configured to heat the glass plate 10 by applying a voltage through the first bus bar 21*a* and the second bus bar 21*b*. The antenna 30 includes the power feeder 31, the first antenna portion 40 electrically connected to the power feeder 31, and the second antenna portion 50 electrically connected to the power feeder 31. The first antenna portion 40 has a portion capacitively coupled to the metal portion of the window frame 2 with the glass plate 10 attached to the window frame 2 in a plan view of the glass plate 10. The second antenna portion 50 includes the first element 51 and the second element 52 having portions extending parallel to each other in the horizontal direction, and the third element 53 connecting the first element 51 and the second element 52 in the vertical direction. The first element 51 and the second element 52 are disposed in that order toward the defogger 20 in the vertical direction, and the second antenna portion 50 has a portion capacitively coupled to the defogger 20. Therefore, the vehicle window glass 1 capable of receiving radio waves of a predetermined frequency with a desired gain can be provided.

Also, in the vehicle window glass 1 according to the embodiment, the first antenna portion 40 includes the first L-shaped element 41 connected to the power feeder 31 and having an L-shape along the metal portion. Therefore, the first antenna portion 40 can be capacitively coupled to the metal portion of the window frame 2 along the corner of the left edge 13 and the upper edge 11 of the glass plate 10.

Also, in the vehicle window glass 1 according to the embodiment, the first antenna portion 40 satisfies a range of $0.10\times\lambda\times k\leq L_1\leq 0.40\times\lambda\times k$ provided that a length thereof capacitively coupled to the metal portion is $L_1$, the wavelength of the radio wave in air in the frequency band received by the antenna 30 is λ, and the wavelength shortening coefficient of the glass plate 10 is k. Therefore, the antenna characteristics of the vehicle window glass 1 can be improved.

Also, in the vehicle window glass 1 according to the embodiment, a range of $0.60\times\lambda\times k\leq L_2\leq 0.90\times\lambda\times k$ is satisfied provided that the power feeder 31 serves as a starting point and that a distance from the power feeder 31 to the open end of the first element 51 via the second element 52 and the third element 53 is $L_2$. Therefore, the antenna characteristics of the vehicle window glass 1 can be improved.

Also, in the vehicle window glass 1 according to the embodiment, the second antenna portion 50 includes the fourth element 54 positioned on an opposite side of the second element 52 with respect to the first element 51 to be connected to the third element 53 and extending in the horizontal direction, and the fourth element 54 has a portion capacitively coupled to the metal portion. Therefore, the second antenna portion 50 can be capacitively coupled to the metal portion of the window frame 2 extending along the upper edge 11 of the glass plate 10.

Also, in the vehicle window glass 1 according to the embodiment, the fourth element 54 satisfies a range of $0.10\times\lambda\times k\leq L_4\leq 0.90\times\lambda\times k$ provided that a length thereof capacitively coupled to the metal portion of the window frame 2 is $L_4$. Therefore, the antenna characteristics of the vehicle window glass 1 can be improved.

Also, in the vehicle window glass 1 according to the embodiment, the fourth element 54 branches from an end portion of the third element 53. Therefore, the conductor pattern of the fourth element 54 is bilaterally symmetrical on the glass plate 10, thereby improving the design.

Also, the vehicle window glass 1 according to the embodiment includes the fifth element 55 positioned on an opposite side of the first antenna portion 40 with respect to the third element 53 to connect the first element 51 and the second element 52 in the vertical direction. Therefore, a loop circuit can be formed to adjust an inductor of the resonant circuit of the antenna 30.

Also, the vehicle window glass 1 according to the embodiment includes the auxiliary element 24 disposed between the defogger 20 and the second element 52 and having an L-shape or a T-shape extending in the horizontal direction. Therefore, the heater wire 22*a* need not be changed into a special shape to capacitively couple the heater wire 22*a* of the defogger 20 and the second element 52.

Also, in the vehicle window glass 1 according to the embodiment, the auxiliary element 24 satisfies a range of $0.10\times\lambda\times k\leq D_H\leq 0.90\times\lambda\times k$ provided that a length of the portion thereof extending in the horizontal direction is $D_H$. Therefore, the antenna characteristics of the vehicle window glass 1 can be improved.

Also, in the vehicle window glass 1 according to the embodiment, the auxiliary element 24 is connected to the heater wire 22*a* closest to the second element 52 among the plurality of heater wires. Therefore, connection between the auxiliary element 24 and the defogger 20 is facilitated.

Also, in the vehicle window glass 1 according to the embodiment, the defogger 20 includes the first short-circuit line 23*a* that short-circuits at least the heater wire 22*a* and the heater wire 22*b* adjacent to the heater wire 22*a*, and the connection point P between the auxiliary element 24 and the heater wire 22*a* is disposed at a position close to the connection point between the first short-circuit line 23*a* and the heater wire 22*a*. Therefore, the first short-circuit line 23*a* and the T-shaped auxiliary element 24 are continuous or substantially continuous in the vertical direction, thereby improving the design.

Also, in the vehicle window glass 1 according to the embodiment, the first short-circuit line 23*a* is disposed at a center between the first bus bar 21*a* and the second bus bar 21*b*. Therefore, the conductor pattern of the defogger 20 is bilaterally symmetrical on the glass plate 10, thereby improving the design.

Also, in the vehicle window glass 1 according to the embodiment, the antenna 30 can receive FM broadcast waves.

Second Embodiment

Figure 2:
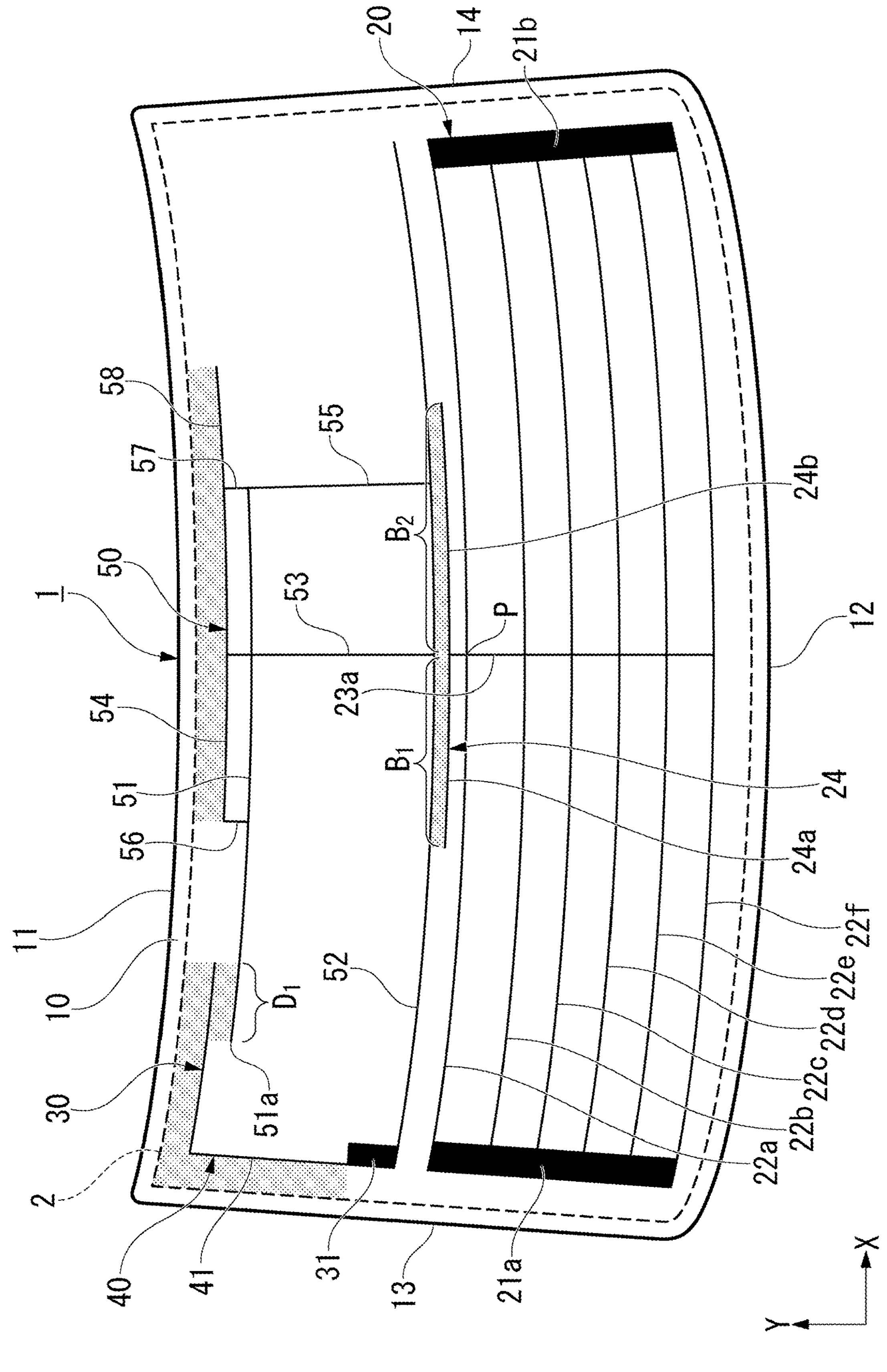
FIG. 2 is a plan view showing a vehicle window glass according to a second embodiment of the invention.

FIG. 2 is a plan view showing a vehicle window glass 1 according to a second embodiment of the invention. Furthermore, in FIG. 2, configurations the same as those in the above-described embodiment will be denoted by the same reference signs.

As shown in FIG. 2, the vehicle window glass 1 of the second embodiment differs from the above-described embodiment in that a second antenna portion 50 includes a sixth element 56, a seventh element 57, and an eighth element 58.

The sixth element 56 is positioned on a first antenna portion 40 side with respect to a third element 53 (on a left side of the third element 53) and connects a first element 51 and a fourth element 54. The sixth element 56 is a linear conductor pattern extending in a vertical direction from one end of the fourth element 54 on the first antenna portion 40 side toward the first element 51, but, as described above, may extend at a predetermined angle θ (for example, in a range of $0° < \theta \leq 75°$ in an absolute value) with respect to the vertical direction. The sixth element 56 forms a loop circuit (particularly a closed loop circuit) to adjust an inductor of a resonant circuit of an antenna 30.

The seventh element 57 is positioned on an opposite side of the first antenna portion 40 side with respect to the third element 53 (on a right side of the third element 53) and connects the first element 51 and the fourth element 54. The seventh element 57 is a linear conductor pattern extending in the vertical direction from one end of the fourth element 54 on an opposite side of the first antenna portion 40 toward the first element 51, but, as described above, may extend at a predetermined angle θ (for example, in a range of $0° < \theta \leq 75°$ in an absolute value) with respect to the vertical direction. The seventh element 57 forms a loop circuit (particularly a closed loop circuit) to adjust an inductor of the resonant circuit of the antenna 30.

The eighth element 58 extends in a horizontal direction from a position close to a connection point of the seventh element 57 with respect to the fourth element 54 to an opposite side of the first antenna portion 40. The eighth element 58 is a linear conductor extending in the horizontal direction from a right end portion of the fourth element 54 toward a right edge 14 of a glass plate 10. Similarly to the fourth element 54, the eighth element 58 is capacitively coupled to a metal portion of a window frame 2 extending along an upper edge 11 of the glass plate 10. Therefore, the eighth element 58 and the metal portion of the window frame 2 function as a part of the antenna.

Also, in the second embodiment, the first element 51 has a portion ($D_1$) that is capacitively coupled to the first antenna portion 40. An end portion of a horizontal portion of the first element 51 on an open end 51*a* side is capacitively coupled to an end portion of a horizontal portion of a first L-shaped element 41. Therefore, the first element 51 and the first L-shaped element 41 function as a part of the antenna. Furthermore, also in the first embodiment shown in FIG. 1, the first element 51 may include the portion ($D_1$) capacitively coupled to the first antenna portion 40.

A distance between the first element 51 and the first L-shaped element 41 is, for example, approximately 10 mm, but may be 30 mm or less, 20 mm or less, or 15 mm or less. The distance between the first element 51 and the first L-shaped element 41 has no particular lower limit, but may be, for example, 1 mm or more, 3 mm or more, or 5 mm or more.

The first element 51 preferably satisfies a range of the following relational expression (5) provided that a length thereof capacitively coupled to the first antenna portion 40 is $D_1$, a wavelength of a radio wave in air in a frequency band received by the antenna 30 is λ, and a wavelength shortening coefficient of the glass plate 10 is k. Therefore, antenna characteristics of the vehicle window glass 1 can be improved. Specifically, the portion ($D_1$) in which the first element 51 is capacitively coupled to the first L-shaped element 41 functions as a peak shift element for the antenna characteristics.

$$0.01\times\lambda\times k \leq D_1 \leq 0.50\times\lambda\times k \quad (5)$$

Also, it is more preferable that the length $D_1$ satisfy the following range.

$$0.05\times\lambda\times k \leq D_1 \leq 0.15\times\lambda\times k \quad (5a)$$

The length ($D_1$) in which the first element 51 is capacitively coupled to the first antenna portion 40 is a horizontal length in which the horizontal portion of the first element 51 on the open end 51*a* side and the horizontal portion of the first L-shaped element 41 face each other at a distance in the vertical direction.

Also, a ratio between the length $B_1$ of a first horizontal auxiliary element 24*a* and a length $B_2$ of a second horizontal auxiliary element 24*b* preferably satisfies a range (6) below. Therefore, the antenna characteristics (high-frequency characteristics) of the vehicle window glass 1 can be improved.

$$1.0{:}0.5 \text{ to } 1.0{:}2.0 \quad (6)$$

Also, the ratio between the length $B_1$ and the length $B_2$ preferably satisfies a range of $$2.0{:}1.0 \text{ to } 1.0{:}2.0 \quad (6a),\text{ and}$$

more preferably satisfies the following range.

$$4.0{:}3.0 \text{ to } 3.0{:}4.0 \quad (6b).$$

As described above, the vehicle window glass 1 of the second embodiment includes the sixth element 56 positioned on the first antenna portion 40 side with respect to the third element 53 to connect the first element 51 and the fourth element 54 in the vertical direction. Therefore, a loop circuit can be formed to adjust an inductor of the resonant circuit of the antenna 30.

Also, the vehicle window glass 1 of the second embodiment includes the seventh element 57 positioned on an opposite side of the first antenna portion 40 with respect to the third element 53 to connect the first element 51 and the fourth element 54 in the vertical direction. Therefore, a loop circuit can be formed to adjust an inductor of the resonant circuit of the antenna 30.

Furthermore, in the vehicle window glass 1 of the second embodiment, the first element 51 has a portion capacitively coupled to the first antenna portion 40. Furthermore, the vehicle window glass 1 of the first embodiment may also have the same portion. Therefore, the end portion of the horizontal portion of the first element 51 on the open end 51*a* side can be capacitively coupled to the end portion of the horizontal portion of the first L-shaped element 41.

Also, in the vehicle window glass 1 of the second embodiment, the first element 51 satisfies a range of $0.01\times\lambda\times k \leq D_1 \leq 0.50\times\lambda\times k$ provided that a length thereof capacitively coupled to the first antenna portion 40 is $D_1$, a wavelength of the radio wave in air in the frequency band received by the antenna 30 is λ, and a wavelength shortening coefficient of the glass plate 10 is k. Therefore, the antenna characteristics of the vehicle window glass 1 can be improved.

Also, in the vehicle window glass 1 according to the embodiment, an auxiliary element 24 has a T-shape, the auxiliary element 24 includes the first horizontal auxiliary element 24*a* extending from a T-shaped branch point toward the first antenna portion 40 and the second horizontal auxiliary element 24*b* extending from the T-shaped branch point toward an opposite side of the first antenna portion 40, and a ratio between the length of the first horizontal auxiliary element 24*a* and the length of the second horizontal auxiliary element 24*b* satisfies the following range.

1.0:0.5 to 1.0:2.0.

Therefore, the antenna characteristics of the vehicle window glass 1 can be improved.

Third Embodiment

Figure 3:
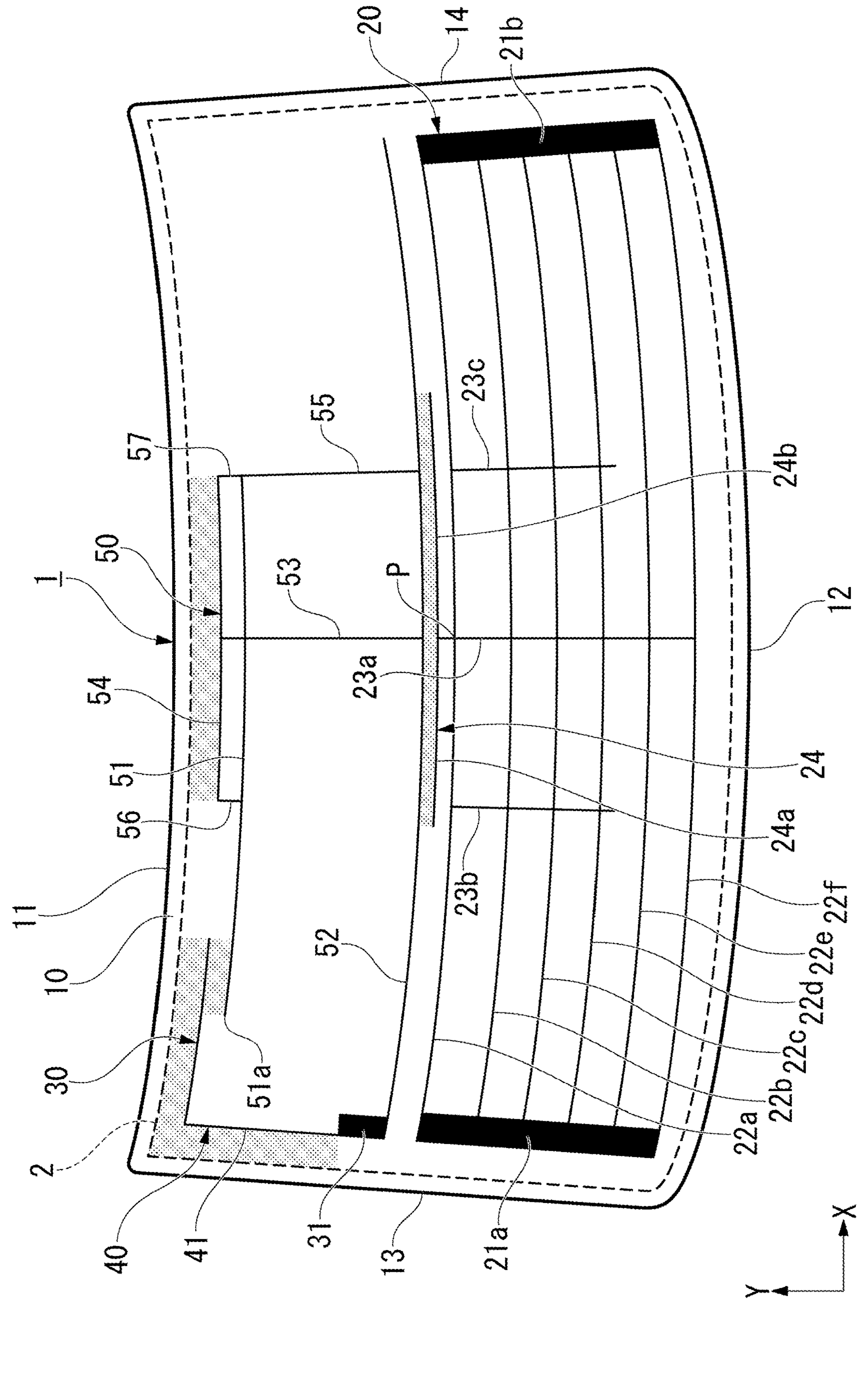
FIG. 3 is a plan view showing a vehicle window glass according to a third embodiment of the invention.

FIG. 3 is a plan view showing a vehicle window glass 1 according to a third embodiment of the invention. Furthermore, in FIG. 3, configurations the same as those in the above-described embodiments will be denoted by the same reference signs.

As shown in FIG. 3, the vehicle window glass 1 of the third embodiment differs from the above-described embodiments in that the defogger 20 includes a second short-circuit line 23*b* and a third short-circuit line 23*c*.

The second short-circuit line 23*b* is disposed between a first bus bar 21*a* and a first short-circuit line 23*a* to short-circuit at least a heater wire 22*a* and a heater wire 22*b*. In the example shown in FIG. 3, the second short-circuit line 23*b* is a linear conductor extending in a vertical direction to short-circuit the heater wires 22*a* to 22*d*, and has one end portion positioned on the heater wire 22*a* and the other end portion positioned between a heater wire 22*d* and a heater wire 22*e*. The second short-circuit line 23*b* is positioned on an inner side in a horizontal direction (on a center side of the glass plate 10) with respect to an end portion of a first horizontal auxiliary element 24*a* on a first antenna portion 40 side.

The third short-circuit line 23*c* is disposed between the first short-circuit line 23*a* and a second bus bar 21*b* to short-circuit at least the heater wire 22*a* and the heater wire 22*b*. In the example shown in FIG. 3, the third short-circuit line 23*c* is a linear conductor extending in the vertical direction to short-circuit the heater wires 22*a* to 22*d*, and has one end portion positioned on the heater wire 22*a* and the other end portion positioned between the heater wire 22*d* and the heater wire 22*e*. The third short-circuit line 23*c* is positioned on an inner side in the horizontal direction (on a center side of the glass plate 10) with respect to an end portion of a second horizontal auxiliary element 24*b* on an opposite side of the first antenna portion 40. The second short-circuit line 23*b* and the third short-circuit line 23*c* have a configuration that is line-symmetrical with respect to the first short-circuit line 23*a*. Furthermore, the second short-circuit line 23*b* and the third short-circuit line 23*c* may short-circuit all the heater wires from the heater wire 22*a* on the first antenna portion 40 side to the heater wire 22*f* on an opposite side of the first antenna portion 40 side. Furthermore, the second short-circuit line 23*b* and the third short-circuit line 23*c* may short-circuit the heater wires from the heater wire 22*f* on an opposite side of the first antenna portion 40 side to the heater wire before the heater wire 22*a* on the first antenna portion 40 side, and it can be set optionally.

As described above, in the vehicle window glass 1 of the third embodiment, the defogger 20 includes the second short-circuit line 23*b* disposed between the first bus bar 21*a* and the first short-circuit line 23*a* to short-circuit at least the heater wire 22*a* and the heater wire 22*b*, and the third short-circuit line 23*c* disposed between the second bus bar 21*b* and the first short-circuit line 23*a* to short-circuit at least the heater wire 22*a* (first heater wire) and the heater wire 22*b* (second heater wire). Therefore, the heater wire 22*a* and the heater wire 22*b* are connected, making it easier to set a length that does not generate a standing wave in a predetermined frequency band received by the antenna 30.

Fourth Embodiment

Figure 4:
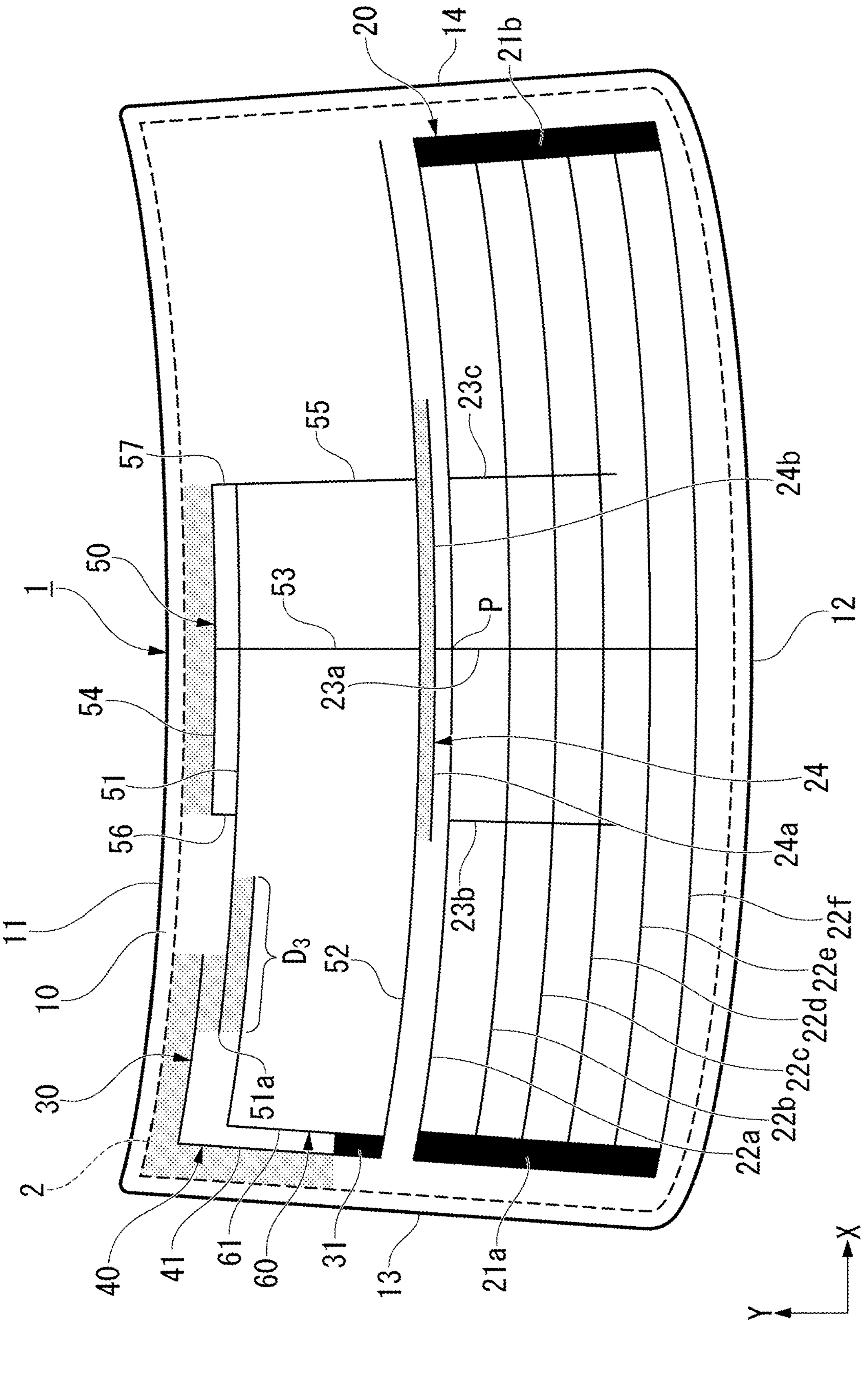
FIG. 4 is a plan view showing a vehicle window glass according to a fourth embodiment of the invention.

FIG. 4 is a plan view showing a vehicle window glass 1 according to a fourth embodiment of the invention. Furthermore, in FIG. 4, configurations the same as those in the above-described embodiments will be denoted by the same reference signs.

As shown in FIG. 4, the vehicle window glass 1 of the fourth embodiment differs from the above-described embodiments in that an antenna 30 includes a third antenna portion 60.

The third antenna portion 60 includes a second L-shaped element 61 connected to a power feeder 31. Furthermore, the second L-shaped element 61 may be connected to a first antenna portion 40 (first L-shaped element 41). That is, the second L-shaped element 61 may be branched from the middle of a linear element of a conductor pattern of the first antenna portion 40 along a left edge 13 of a glass plate 10. In this case, the second L-shaped element 61 also has a portion common to the first L-shaped element 41. The second L-shaped element 61 has an L-shape on an opposite side of a metal portion of a window frame 2 with respect to the first antenna portion 40. The second L-shaped element 61 is a conductor pattern bent in an L-shape along the first L-shaped element 41 from the power feeder 31.

A horizontal portion of a first element 51 on an open end 51*a* side is disposed between a horizontal portion of the second L-shaped element 61 and a horizontal portion of the first L-shaped element 41. The horizontal portion ($D_3$) of the second L-shaped element 61 is capacitively coupled to the horizontal portion of the first element 51 on the open end 51*a* side. Therefore, the second L-shaped element 61 and the first element 51 function as a part of the antenna.

A distance between the first element 51 and the second L-shaped element 61 is, for example, approximately 10 mm, but may be 30 mm or less, 20 mm or less, or 15 mm or less. The distance between the first element 51 and the second L-shaped element 61 has no particular lower limit, but may be, for example, 1 mm or more, 3 mm or more, or 5 mm or more.

The first element 51 preferably satisfies the following relational expression (7) provided that a length thereof capacitively coupled to the third antenna portion 60 (the second L-shaped element 61) is $D_3$, a wavelength of a radio wave in air in a frequency band received by the antenna 30 is λ, and a wavelength shortening coefficient of the glass plate 10 is k. Therefore, antenna characteristics of the vehicle window glass 1 can be improved. Specifically, the portion ($D_3$) in which the first element 51 is capacitively coupled to the second L-shaped element 61 functions as a peak shift element for the antenna characteristics.

$$0.01\times\lambda\times k\leq D_3\leq 0.40\times\lambda\times k \quad (7)$$

Also, it is more preferable that the length $D_3$ satisfy the following range.

$$0.05\times\lambda\times k\leq D_3\leq 0.15\times\lambda\times k \quad (7a)$$

The length ($D_3$) in which the first element 51 is capacitively coupled to the third antenna portion 60 is a horizontal length in which the horizontal portion of the first element 51 on the open end 51*a* side and the horizontal portion of the second L-shaped element 61 face each other at a distance in the vertical direction. Furthermore, the length ($D_3$) in which the first element 51 is capacitively coupled to the third antenna portion 60 is larger than the length ($D_1$) in which the first element 51 is capacitively coupled to the first antenna portion 40.

As described above, in the vehicle window glass 1 of the fourth embodiment, the antenna 30 includes the third antenna portion 60 electrically connected to the power feeder 31, and the first element 51 has a portion that is capacitively coupled to a part of the third antenna portion 60.

Also, in the vehicle window glass 1 of the fourth embodiment, the first element 51 satisfies a range of $0.01\times\lambda\times k\leq D_3\leq 0.40\times\lambda\times k$ provided that a length thereof capacitively coupled to the third antenna portion 60 is $D_3$, a wavelength of the radio wave in air in the frequency band received by the antenna 30 is λ, and a wavelength shortening coefficient of the glass plate 10 is k. Therefore, the antenna characteristics of the vehicle window glass 1 can be improved.

Also, in the vehicle window glass 1 of the fourth embodiment, the third antenna portion 60 includes the second L-shaped element 61 connected to the power feeder 31 or the first antenna portion 40 and having an L-shape on an opposite side of the metal portion of the window frame 2 with respect to the first antenna portion 40. Therefore, the second L-shaped element 61 need not be interposed between the first antenna portion 40 and the metal portion of the window frame 2 that are capacitively coupled.

Also, in the vehicle window glass 1 of the fourth embodiment, the third antenna portion 60 is disposed on an opposite side of the first antenna portion 40 with respect to the first element 51. Therefore, capacitive coupling can be made from both the first antenna portion 40 and the third antenna portion 60 with respect to the first element 51.

Although the vehicle window glass according to the embodiments of the invention has been described above, the invention is not limited to the above-described embodiments, and can be freely changed within the scope of the invention. For example, some or all of each embodiment may be implemented in combination.

EXAMPLES

Effects of the invention will become apparent by examples below. Furthermore, the invention is not limited to the following examples, and can be implemented with appropriate modifications within a range not changing the gist thereof.

First Example

Figure 5:
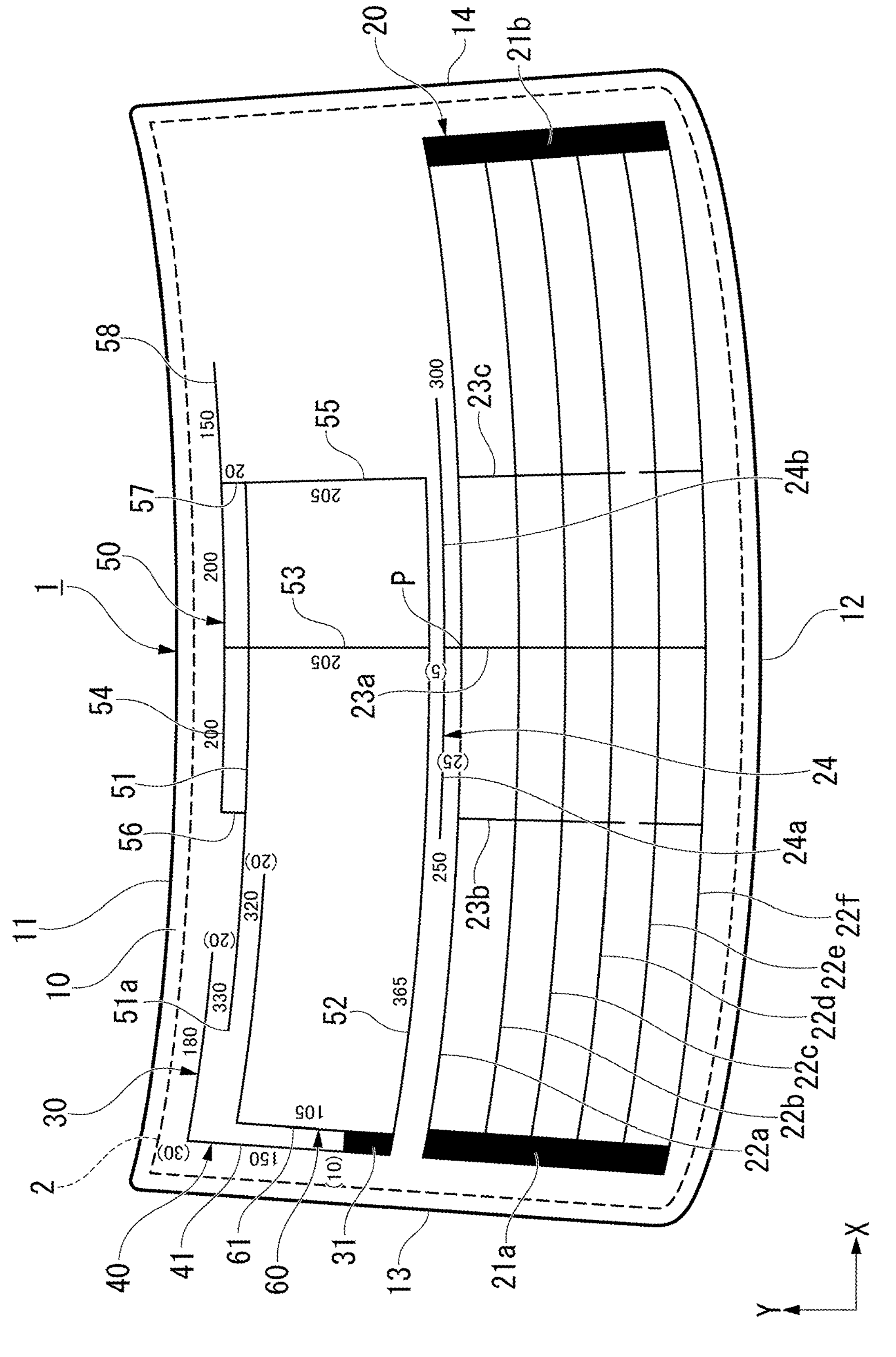
FIG. 5 is a plan view showing a vehicle window glass according to a first example of the invention.

FIG. 5 is a plan view showing a vehicle window glass 1 according to a first example of the invention. Furthermore, in FIG. 5, configurations the same as those in the above-described embodiments will be denoted by the same reference signs.

A first antenna portion 40 of the first example has the following dimensions. A total length of a first L-shaped element 41 is 330 mm. Specifically, a length of a vertical portion of the first L-shaped element 41 is 150 mm. A length of a horizontal portion of the first L-shaped element 41 is 180 mm. A distance between the vertical portion of the first L-shaped element 41 and a metal portion of a window frame 2 is 10 mm. A distance between the horizontal portion of the first L-shaped element 41 and the metal portion of the window frame 2 is 30 mm.

A second antenna portion 50 of the first example has the following dimensions. A total length of a fourth element 54 including an eighth element 58 is 550 mm. Specifically, a length of a left side of the fourth element 54 with respect to a third element 53 is 200 mm. A length of a right side of the fourth element 54 with respect to the third element 53 is 200 mm up to a seventh element 57, and 150 mm is added when a length of the eighth element 58 is included, for a total of 350 mm. A distance between the fourth element and the metal portion of the window frame 2 is 30 mm.

A total length of a first element 51 is 720 mm. Specifically, a length of a left side (open end 51*a* side) of the first element 51 with respect to the third element 53 is 200 mm up to a sixth element 56, and 320 mm is added when a length to the open end 51*a* is included, for a total of 520 mm. A length of a right side of the fourth element 54 with respect to the third element 53 is 200 mm. A distance between the first element 51 and the horizontal portion of the first L-shaped element 41 is 20 mm.

A total length of a second element 52 is 765 mm. Specifically, a length of the second element 52 from a power feeder 31 to the third element 53 is 365 mm+200 mm, for a total of 565 mm. A length of the second element 52 from the third element 53 to a fifth element 55 is 200 mm. A distance between the second element 52 and an auxiliary element 24 is 5 mm.

A total length of the third element 53 is 225 mm. Specifically, a length of the third element 53 from the second element 52 to the first element 51 is 205 mm. A length of the third element 53 from the first element 51 to the fourth element 54 is 20 mm. A total length of the fifth element 55 is 205 mm.

A third antenna portion 60 of the first example has the following dimensions. A total length of a second L-shaped element 61 is 425 mm. Specifically, a length of a vertical portion of the second L-shaped element 61 is 105 mm. A length of a horizontal portion of the second L-shaped element 61 is 320 mm. A distance between the vertical portion of the second L-shaped element 61 and the vertical portion of the first L-shaped element 41 is 10 mm. A distance between the horizontal portion of the second L-shaped element 61 and the first element 51 is 20 mm.

The auxiliary element 24 of the first example has the following dimensions. A total length of the auxiliary element 24 is 550 mm. Specifically, a length of a first horizontal auxiliary element 24*a* is 250 mm. A length of a second horizontal auxiliary element 24*b* is 300 mm. A distance between the auxiliary element 24 and a heater wire 22*a* is 25 mm.

Figure 6:
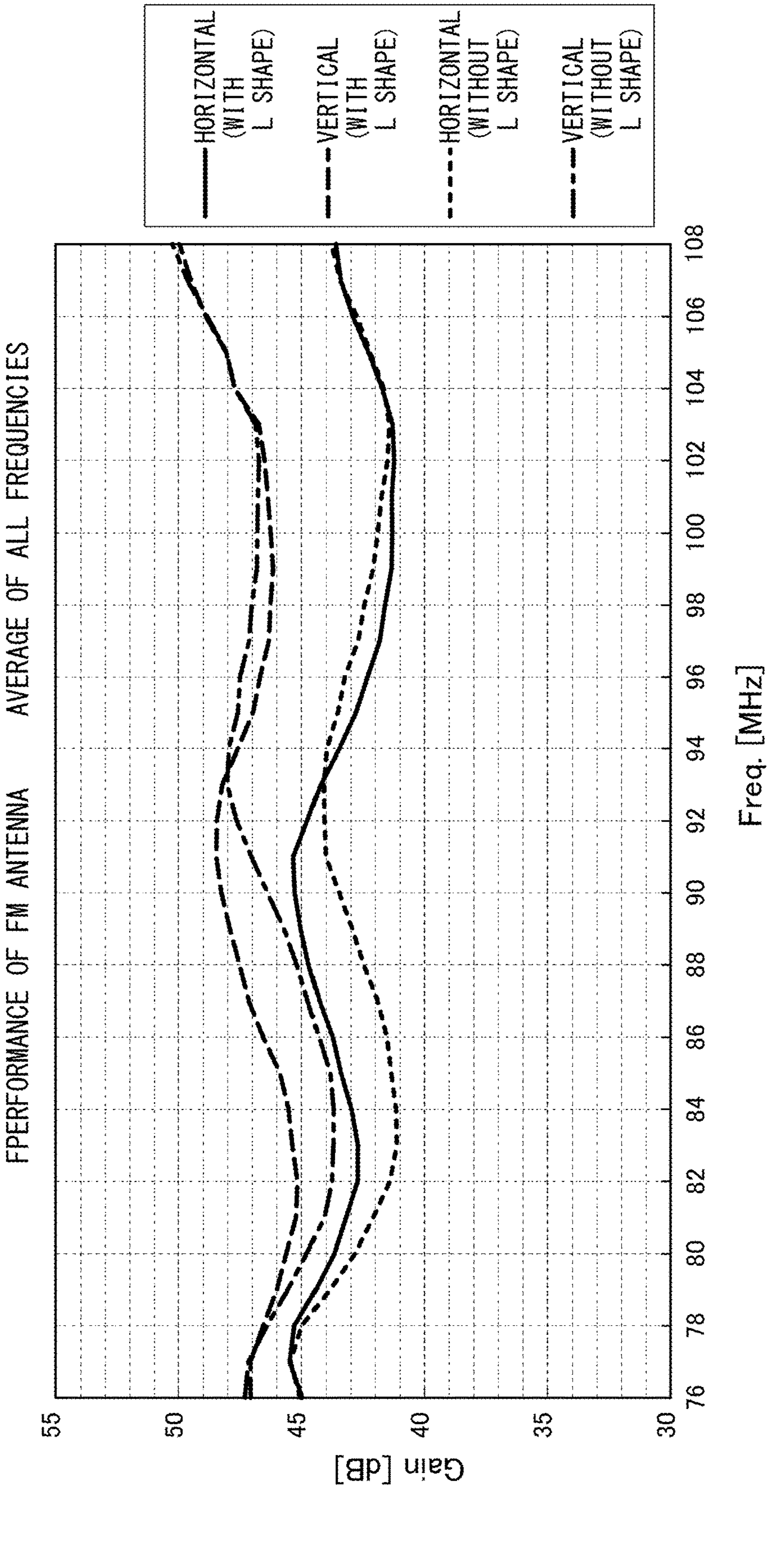
FIG. 6 is a graph showing actual measurement results of an antenna gain of the vehicle window glass according to the first example.
Figure 8:
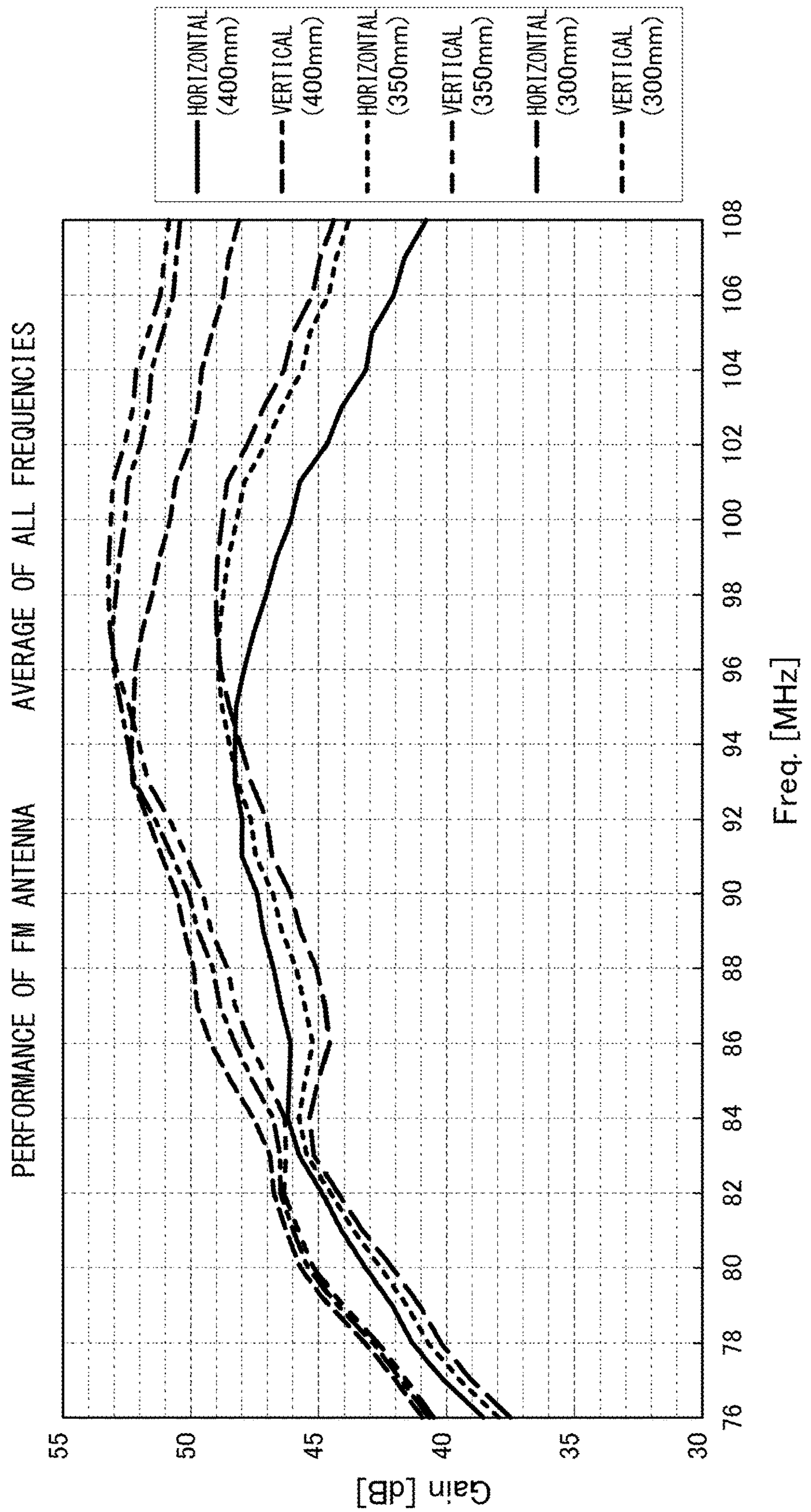
FIG. 8 is a graph showing actual measurement results of an antenna gain of the vehicle window glass according to the second example.

FIG. 6 is a graph showing actual measurement results of an antenna gain of the vehicle window glass 1 according to the first example. In FIG. 6 and FIG. 8 to be described later, the horizontal axis represents a frequency [MHz] and the vertical axis represents a gain [dB]. "Horizontal" in FIG. 6 and FIG. 8 to be described later indicates an antenna gain for horizontally polarized waves in an FM band. Also, "vertical" in FIG. 6 and FIG. 8 to be described later indicates an antenna gain for vertically polarized waves in the FM band. "With L-shape" in FIG. 6 indicates a case in which the vehicle window glass 1 includes the first L-shaped element 41. Furthermore, "without L-shape" in FIG. 6 indicates a case in which the vehicle window glass 1 does not include the first L-shaped element 41.

Referring to FIG. 6, it can be ascertained that the antenna gain in a range of the FM band (76 MHz to 108 MHz) when the first L-shaped element 41 is provided is higher than that when the first L-shaped element 41 is not provided in both vertically polarized waves and horizontally polarized waves.

Second Example

Figure 7:
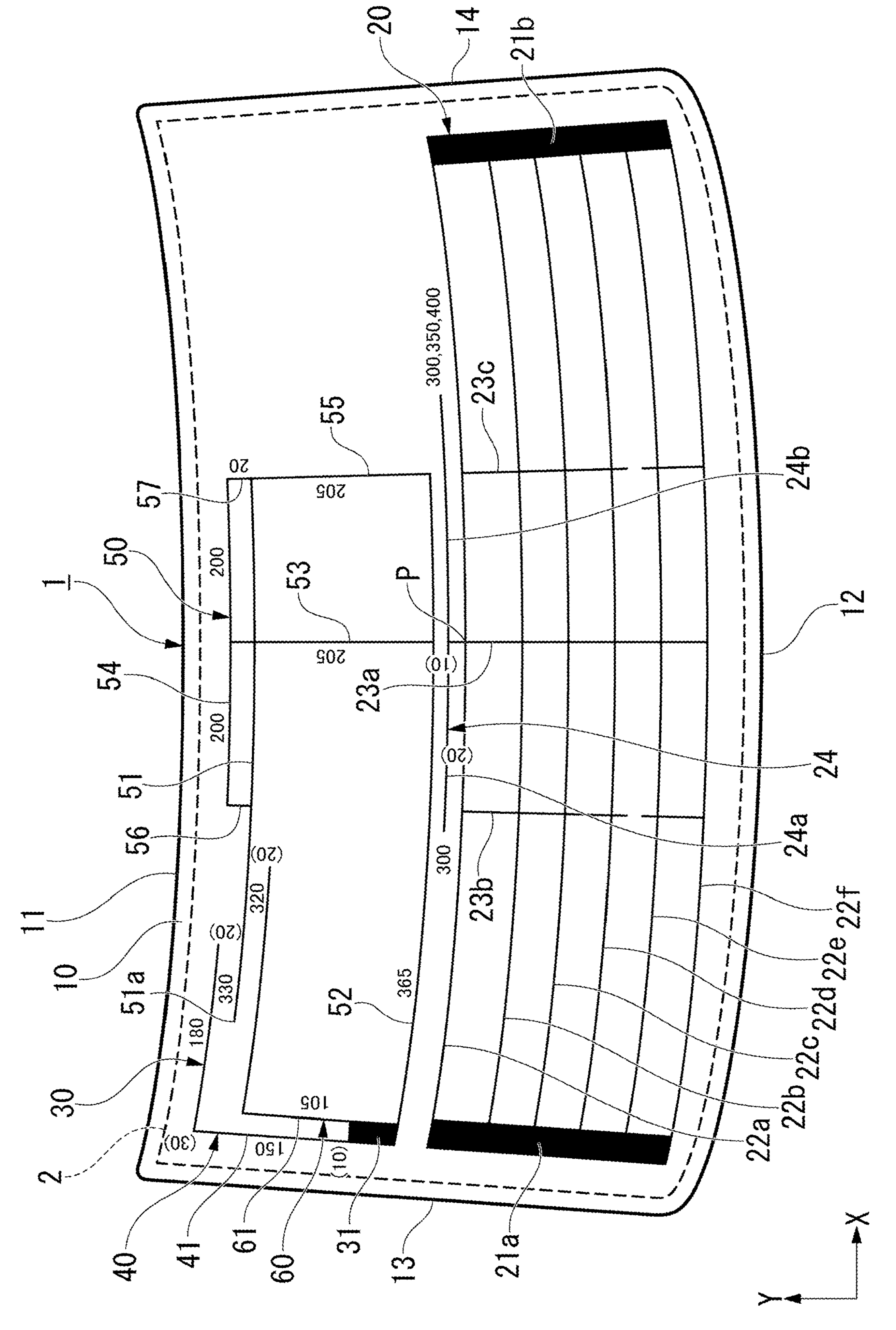
FIG. 7 is a plan view showing a vehicle window glass according to a second example of the invention.

FIG. 7 is a plan view showing a vehicle window glass 1 according to a second example of the invention. Furthermore, in FIG. 7, configurations the same as those in the above-described embodiments will be denoted by the same reference signs.

As shown in FIG. 7, the vehicle window glass 1 of the second example differs from the above-described first example in that the length of the second horizontal auxiliary element 24*b* is changed to 300 mm, 350 mm, and 400 mm. Other dimensions are the same as those in the first example. Furthermore, the vehicle window glass 1 of the second example does not include the eighth element 58.

FIG. 8 is a graph showing actual measurement results of an antenna gain of the vehicle window glass 1 according to the second example. "400 mm," "350 mm," and "300 mm" in FIG. 8 each indicate a length of the second horizontal auxiliary element 24*b*.

Referring to FIG. 8, it can be ascertained that, when the length of the second horizontal auxiliary element 24*b* is changed to 300 mm, 350 mm, and 400 mm with respect to a length of the first horizontal auxiliary element 24*a* of 300 mm, the antenna gain in a range of the FM band (76 MHz to 108 MHz) becomes higher in order of 400 mm, 350 mm, and 300 mm in both vertically polarized waves and horizontally polarized waves.

A center frequency of the FM band is 92 MHz and a center wavelength (λ) thereof is 3258 mm. Also, if a wavelength shortening coefficient (k) of a glass plate 10 is set to 0.64, each dimension of the antenna 30 of the first example and the second example is set to a preferable length in the relational expressions (1) to (8) and the ranges described above.

As described above, according to the first example and the second example, it can be ascertained that it is possible to provide the vehicle window glass 1 capable of receiving radio waves of a predetermined frequency with a desired gain.

In addition, the components in the above-described embodiments can be appropriately replaced with well-known components within a range not departing from the meaning of the invention. While preferred embodiments of the invention have been described and shown above, it should be understood that these are exemplary of the invention and are not to be considered as limiting. Additions, omissions, substitutions, and other modifications can be made without departing from the spirit or scope of the invention. Accordingly, the invention is not to be considered as being limited by the foregoing description, and is only limited by the scope of the appended claims.

What is claimed is:

1. A vehicle window glass configured to be attached to a window frame at a rear portion of a vehicle body, comprising:

a glass plate;

an antenna provided on the glass plate; and a defogger provided on the glass plate, wherein a direction parallel to a horizontal plane is defined as a horizontal direction, and a direction orthogonal to the horizontal direction is defined as a vertical direction in a plan view with the vehicle window glass attached to the window frame, the defogger comprises:

a first bus bar extending in the vertical direction at a first end of the glass plate in the horizontal direction;

a second bus bar extending in the vertical direction at a second, opposite side of the glass plate in the horizontal direction; and a plurality of heater wires disposed between the first bus bar and the second bus bar, the plurality of heater wires being configured to heat the glass plate by applying a voltage through the first bus bar and the second bus bar, the antenna comprises:

a power feeder;

a first antenna portion electrically connected to the power feeder; and a second antenna portion electrically connected to the power feeder, the first antenna portion comprises a portion capacitively coupled to a metal portion of the window frame with the glass plate attached to the window frame in a plan view of the glass plate, the second antenna portion comprises:

a first element comprising a first element portion extending in the horizontal direction;

a second element comprising a second element portion extending in the horizontal direction; and a third element connecting the first element and the second element, the second element is closer to the defogger than the first element in the vertical direction, and the second antenna portion comprises a portion capacitively coupled to the defogger, and wherein the first element has an open end, and a distance $L_2$ from the power feeder to the open end of the first element via the second element and the third element satisfies: $0.60\times\lambda\times k\leq L_2\leq 0.90\times\lambda\times k$, wherein λ is a wavelength of a radio wave in air in a frequency band received by the antenna, and k is a wavelength shortening coefficient of the glass plate.

2. The vehicle window glass according to claim 1, wherein the first antenna portion comprises a first L-shaped element, and the first L-shaped element is connected to the power feeder and has an L-shape which follows the contours of the metal portion of the window frame.

3. The vehicle window glass according to claim 1, wherein the length, $L_1$, of the first antenna portion capacitively coupled to the metal portion of the window frame is given by $0.10\times\lambda\times k\leq L_1\leq 0.40\times\lambda\times k$, wherein λ is the wavelength of a radio wave in air of a frequency band received by the antenna, and k is a wavelength shortening coefficient of the glass plate".

4. The vehicle window glass according to claim 1, wherein the second antenna portion comprises a fourth element, and the fourth element is connected to the third element and is positioned between the first element and the metal portion of the window frame, while extending in the horizontal direction, and the fourth element comprises a portion capacitively coupled to the metal portion of the window frame.

5. The vehicle window glass according to claim 4, wherein the length, $L_4$, of the fourth element capacitively coupled to the metal portion of the window frame is given by $0.10\times\lambda\times k\leq L_4\leq 0.90\times\lambda\times k$, wherein λ is the wavelength of a radio wave in air of a frequency band received by the antenna, and k is a wavelength shortening coefficient of the glass plate.

6. A vehicle window glass configured to be attached to a window frame at a rear portion of a vehicle body, comprising:

a glass plate;

an antenna provided on the glass plate; and a defogger provided on the glass plate, wherein a direction parallel to a horizontal plane is defined as a horizontal direction, and a direction orthogonal to the horizontal direction is defined as a vertical direction in a plan view with the vehicle window glass attached to the window frame, the defogger comprises:

a first bus bar extending in the vertical direction at a first end of the glass plate in the horizontal direction;

a second bus bar extending in the vertical direction at a second, opposite side of the glass plate in the horizontal direction; and a plurality of heater wires disposed between the first bus bar and the second bus bar, the plurality of heater wires being configured to heat the glass plate by applying a voltage through the first bus bar and the second bus bar, the antenna comprises:

a power feeder;

a first antenna portion electrically connected to the power feeder; and a second antenna portion electrically connected to the power feeder, the first antenna portion comprises a portion capacitively coupled to a metal portion of the window frame with the glass plate attached to the window frame in a plan view of the glass plate, the second antenna portion comprises:

a first element comprising a first element portion extending in the horizontal direction;

a second element comprising a second element portion extending in the horizontal direction; and a third element connecting the first element and the second element, the second element is closer to the defogger than the first element in the vertical direction, and the second antenna portion comprises a portion capacitively coupled to the defogger, wherein the vehicle window glass further comprises a fifth element positioned to connect the first element and the second element and wherein the third element is positioned between the fifth element and a vertical portion of the first antenna portion.

7. A vehicle window glass configured to be attached to a window frame at a rear portion of a vehicle body, comprising:

a glass plate;

an antenna provided on the glass plate; and a defogger provided on the glass plate, wherein a direction parallel to a horizontal plane is defined as a horizontal direction, and a direction orthogonal to the horizontal direction is defined as a vertical direction in a plan view with the vehicle window glass attached to the window frame, the defogger comprises:

a first bus bar extending in the vertical direction at a first end of the glass plate in the horizontal direction;

a second bus bar extending in the vertical direction at a second, opposite side of the glass plate in the horizontal direction; and a plurality of heater wires disposed between the first bus bar and the second bus bar, the plurality of heater wires being configured to heat the glass plate by applying a voltage through the first bus bar and the second bus bar, the antenna comprises:

a power feeder;

a first antenna portion electrically connected to the power feeder; and a second antenna portion electrically connected to the power feeder, the first antenna portion comprises a portion capacitively coupled to a metal portion of the window frame with the glass plate attached to the window frame in a plan view of the glass plate, the second antenna portion comprises:

a first element comprising a first element portion extending in the horizontal direction;

a second element comprising a second element portion extending in the horizontal direction; and a third element connecting the first element and the second element, the second element is closer to the defogger than the first element in the vertical direction, and the second antenna portion comprises a portion capacitively coupled to the defogger, the second antenna portion comprises a fourth element, and the fourth element is connected to the third element and is positioned between the first element and the metal portion of the window frame, while extending in the horizontal direction, and the fourth element comprises a portion capacitively coupled to the metal portion of the window frame, the vehicle window glass further comprises a sixth element to connect the first element and the fourth element and wherein the sixth element is positioned between the third element and a vertical portion of the first antenna portion.

8. The vehicle window glass according to claim 4, further comprising a seventh element to connect the first element and the fourth element and wherein the third element is positioned between the seventh element and a vertical portion of the first antenna portion.

9. The vehicle window glass according to claim 1, wherein the first element comprises a portion capacitively coupled to the first antenna portion.

10. The vehicle window glass according to claim 9, wherein the length, $D_1$, of the portion of the first element capacitively coupled to the first antenna portion is given by $0.01 \times \lambda \times k \leq D_1 \leq 0.50 \times \lambda \times k$, wherein $\lambda$ is the wavelength of a radio wave in air of a frequency band received by the antenna, and k is a wavelength shortening coefficient of the glass plate.

11. The vehicle window glass according to claim 1, further comprising an auxiliary element disposed between the defogger and the second element, wherein the auxiliary element has an L-shape or a T-shape.

12. The vehicle window glass according to claim 11, wherein the length, $D_H$, of a portion of the auxiliary element extending in the horizontal direction is given by $0.10 \times \lambda \times k \leq D_H \leq 0.90 \times \lambda \times k$, wherein $\lambda$ is the wavelength of a radio wave in air of a frequency band received by the antenna, and k is a wavelength shortening coefficient of the glass plate.

13. The vehicle window glass according to claim 11, wherein the auxiliary element has a T-shape, and comprises:

a first horizontal auxiliary element extending from a branch point toward the first side of the window glass; and a second horizontal auxiliary element extending from the branch point toward the second, opposite side of the window glass; and a ratio between a length of the first horizontal auxiliary element and a length of the second horizontal auxiliary element satisfies a range of 1.0:0.5 to 1.0:2.0.

14. The vehicle window glass according to claim 11, wherein the plurality of heater wires comprises a first heater wire closest to the second element, and the auxiliary element is connected to the first heater wire.

15. The vehicle window glass according to claim 14, wherein the defogger comprises a first short-circuit line which short-circuits at least the first heater wire and a second heater wire adjacent to the first heater wire, and a connection point between the auxiliary element and the first heater wire is disposed at a position at or adjacent to a connection point between the first short-circuit line and the first heater wire.

16. The vehicle window glass according to claim 15, wherein the defogger comprises:

a second short-circuit line disposed between the first bus bar and the first short-circuit line to short-circuit at least the first heater wire and the second heater wire; and a third short-circuit line disposed between the second bus bar and the first short-circuit line to short-circuit at least the first heater wire and the second heater wire.

17. The vehicle window glass according to claim 1, wherein the antenna comprises a third antenna portion electrically connected to the power feeder, and the first element comprises a portion capacitively coupled to a part of the third antenna portion.

18. The vehicle window glass according to claim 17, wherein $D_3$, the length of a portion of the first element capacitively coupled to the third antenna portion, satisfies a range of $0.01\times\lambda\times k\leq D_3\leq 0.40\times\lambda\times k$, wherein a wavelength of a radio wave in air in a frequency band received by the antenna is $\lambda$, and a wavelength shortening coefficient of the glass plate is k.

19. The vehicle window glass according to claim 17, wherein the capacitively coupled portion of the first element is disposed between horizontal portions of the third antenna portion and the first element.

* * * * *